United States Patent
Hashizume (10) Patent No.: US 9,282,199 B2
(45) Date of Patent: Mar. 8, 2016

(54) IMAGE FORMING APPARATUS, IMAGE DIAGNOSTIC METHOD, AND IMAGE DIAGNOSTIC SYSTEM

(71) Applicant: CANON KABUSHIKI KAISHA, Tokyo (JP)

(72) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/556,396

(22) Filed: Dec. 1, 2014

(65) Prior Publication Data

US 2015/0170008 A1 Jun. 18, 2015

(30) Foreign Application Priority Data

Dec. 18, 2013 (JP) ................. 2013-261836

(51) Int. Cl.
| | | |
|---|---|---|
| H04N 1/00 | (2006.01) | |
| H04N 1/56 | (2006.01) | |
| H04N 1/387 | (2006.01) | |
| B41J 29/393 | (2006.01) | |
| H04N 1/409 | (2006.01) | |
| H04N 1/60 | (2006.01) | |

(52) U.S. Cl.
CPC ........... *H04N 1/00074* (2013.01); *B41J 29/393* (2013.01); *H04N 1/00005* (2013.01); *H04N 1/00018* (2013.01); *H04N 1/00037* (2013.01); *H04N 1/00045* (2013.01); *H04N 1/00053* (2013.01); *H04N 1/00058* (2013.01); *H04N 1/00278* (2013.01); *H04N 1/387* (2013.01); *H04N 1/4097* (2013.01); *H04N 1/56* (2013.01); *H04N 1/605* (2013.01); *H04N 1/6038* (2013.01); *H04N 2201/0081* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 2006/0012833 | A1* | 1/2006 | Ito et al. ................... | 358/400 |
| 2010/0067025 | A1* | 3/2010 | Agehama .................. | 358/1.9 |
| 2010/0177365 | A1* | 7/2010 | Chung et al. ............. | 358/504 |
| 2011/0019245 | A1* | 1/2011 | Adachi ...................... | 358/448 |

FOREIGN PATENT DOCUMENTS

JP 2005-176045 A 6/2005

* cited by examiner

*Primary Examiner* — Fan Zhang
(74) *Attorney, Agent, or Firm* — Fitzpatrick, Cella, Harper & Scinto (57) ABSTRACT

An image forming apparatus is configured to print a predetermined test chart that corresponds to an image defect to be analyzed, and to transmit the printed test chart to an image diagnostic apparatus as scanned image data. The image forming apparatus includes: an image forming unit that prints the test chart; a scanning unit that scans the test chart printed by the image forming unit and acquiring the image data; and a transmission unit that transmits the image data of the test chart scanned by the scanning unit, after changing the size of the image data corresponding to the defect.

14 Claims, 6 Drawing Sheets

| ANALYSIS CHART | ANALYSIS TECHNIQUE | IMAGE QUALITY PROBLEM | TRANSMISSION SETTINGS | | |
|---|---|---|---|---|---|
| | | | RESOLUTION | COMPRESSION RATE | COLOR |
| SOLID CHART | 1 | DUST PROBLEM | 600 | LOW | BW |
| SOLID CHART | 1 | STREAK PROBLEM | 600 | LOW | BW |
| SOLID CHART | 1 | DOT UNEVENNESS PROBLEM | 300 | LOW | BW |
| SOLID CHART | 1 | LINE UNEVENNESS PROBLEM | 600 | LOW | BW |
| FINE LINE CHART | 2 | FINE LINE PROBLEM | 600 | LOW | BW |
| COLOR PATCH CHART | 3 | COLOR PROBLEM | 300 | HIGH | CL |

| ANALYSIS CHART | ANALYSIS TECHNIQUE | IMAGE QUALITY PROBLEM | TRANSMISSION SETTINGS | | |
|---|---|---|---|---|---|
| | | | RESOLUTION | COMPRESSION RATE | COLOR |
| SOLID CHART | 1 | DUST PROBLEM | 600 | LOW | BW |
| SOLID CHART | 1 | STREAK PROBLEM | 600 | LOW | BW |
| SOLID CHART | 1 | DOT UNEVENNESS PROBLEM | 300 | LOW | BW |
| SOLID CHART | 1 | LINE UNEVENNESS PROBLEM | 600 | LOW | BW |
| FINE LINE CHART | 2 | FINE LINE PROBLEM | 600 | LOW | BW |
| COLOR PATCH CHART | 3 | COLOR PROBLEM | 300 | HIGH | CL |

IMAGE FORMING APPARATUS, IMAGE DIAGNOSTIC METHOD, AND IMAGE DIAGNOSTIC SYSTEM

BACKGROUND OF THE INVENTION

1. Field of the Invention

The present invention relates to an image forming apparatus, in which a formed image, for example, can be subjected to remote analysis, or the like, and relates to an image diagnostic method and an image diagnostic system for an image forming apparatus.

2. Description of the Related Art

Currently, an image diagnostic system is provided as service support for diagnosis of an image forming apparatus. The image diagnostic system aims to, at a remotely-located service center, analyze a user image in which a problem (image quality problem) has occurred, so as to rapidly resolve the problem. When such a problem occurs, the user makes a service call to the service center. The service center deals with the problem by telephone, and requests the user to output an image diagnostic chart and to provide a scanned image of the output chart. The user outputs the chart according to the instruction of the service center and transmits the scanned image to the service center. The service center analyzes the image transmitted by the user using the image diagnostic system to find the cause of the image quality problem of the user. Based on the analysis results, a service person carrying replacement parts is mobilized to the user's location. Thus, the image quality problem can be resolved with one instance of mobilization. Alternatively, in the case where replacement of parts is not necessary and the problem can be addressed by simply performing settings, calibration, and the like, it is possible to solve the problem quickly by the user performing such an operation. Also, a technique has been proposed in which, in the case where the target of maintenance is a malfunction that does not require part replacement, such as skewing and misregistration, automatic calibration is performed according to the diagnostics result obtained by printing a predetermined chart, scanning the printed chart, and transmitting it to a diagnostic apparatus, without intervention of the service person (see Japanese Patent Laid-Open No. 2005-176045).

Generally, in order to grasp the image quality problem of the user from such an output image, a plurality of images are necessary. Further, in order to correctly analyze the images, high quality image data is necessary, and therefore a large amount of image data is generally necessary for image diagnostics for one apparatus. Having a high resolution and a high tone is a condition for achieving high image quality, and due to the fact that image quality generally deteriorates when image compression is performed, a large amount of image data needs to be transmitted from the image forming apparatus to the service center for the image diagnostics. In order to limit the amount of image data, processing such as reducing the resolution of the images and increasing the compression rate needs to be performed, which incurs deterioration of the image quality. It is also conceivable to use a method of reducing the number of images, but if the number of images is improperly reduced, there is a possibility of missing the image quality problem being pointed out by the user. Therefore, it is difficult to reduce the amount of image data without a reduction in accuracy of the image diagnostics.

SUMMARY OF THE INVENTION

The present invention, which has been devised in view of the conventional examples described above, provides an image forming apparatus, an image diagnostic method, and an image diagnostic system, in which the amount of image data is reduced without a reduction in the accuracy of the image diagnostics.

According to an aspect of the present invention, there is provided an image forming apparatus configured to print a predetermined test chart that corresponds to an image defect to be analyzed, and to transmit the printed test chart to an image diagnostic apparatus as scanned image data, the image forming apparatus comprising: an image forming unit that prints the test chart; a scanning unit that scans the test chart printed by the image forming unit and acquiring the image data; and a transmission unit that transmits the image data of the test chart scanned by the scanning unit, after changing a size of the image data corresponding to the defect.

According to another aspect of the present invention, there is provided an image diagnostic method in which a predetermined test chart that corresponds to an image defect to be analyzed is printed, and the printed test chart is transmitted to an image diagnostic apparatus as scanned image data by an image forming apparatus, the method comprising: printing the test chart using the image forming apparatus; scanning the test chart printed in the printing to acquire image data; transmitting to the image diagnostic apparatus the image data of the test chart, which was scanned in the scanning, and has a data size that has been changed corresponding to the defect; and specifying a problem of the image forming apparatus by analyzing the image data of the test chart transmitted to the image diagnostic apparatus in the transmitting.

The present invention makes it possible to reduce the size of image data to be transmitted without a reduction in the accuracy of image diagnostics.

Further features of the present invention will become apparent from the following description of exemplary embodiments with reference to the attached drawings.

DESCRIPTION OF THE EMBODIMENTS

Embodiment 1

Configuration of Remote Analysis System

Figure 2:
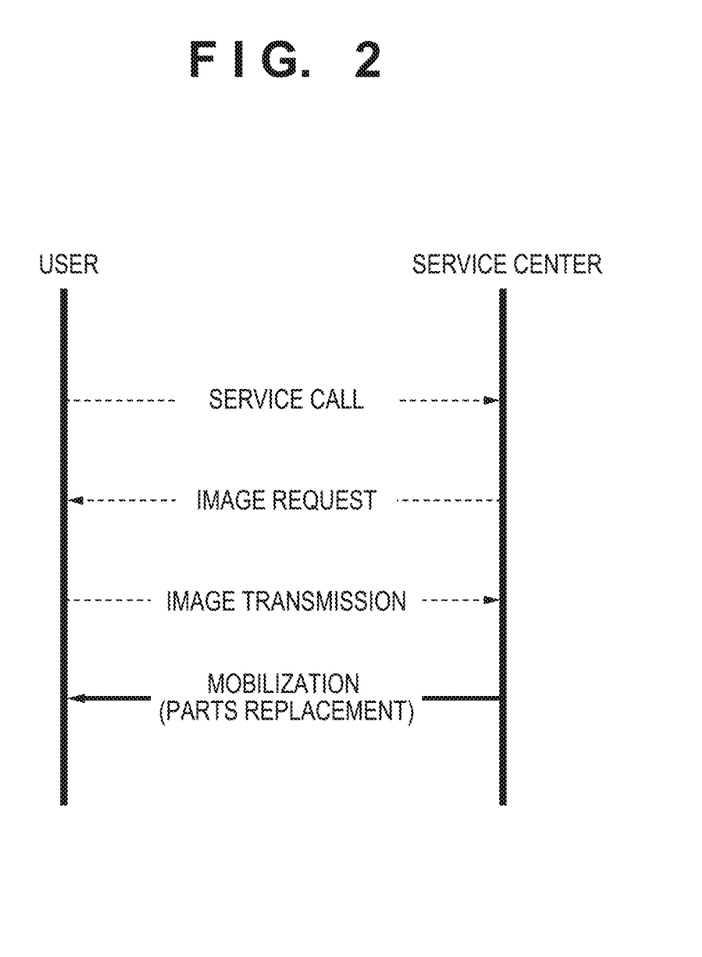
FIG. 2 is a view showing procedures for image diagnostics.

Hereinafter, embodiments for implementing the present invention will be described with reference to the drawings. FIG. 2 shows procedures of image diagnostics according to this embodiment. When a problem occurs, a user makes a service call to a service center. The service center deals with the problem by telephone, and requests the user to output an image diagnostic chart and to provide a scanned image of the output chart. The user outputs the chart according to the instruction of the service center, and transmits the scanned image to the service center. The service center analyzes the image transmitted by the user using the image diagnostic system to find the cause of the image quality problem of the user. Based on the analysis results, a service person carrying replacement parts is mobilized to the user's location. With this procedure, a diagnosis is made using the test chart, and the cause of the problem in the apparatus is specified.

Figure 1:
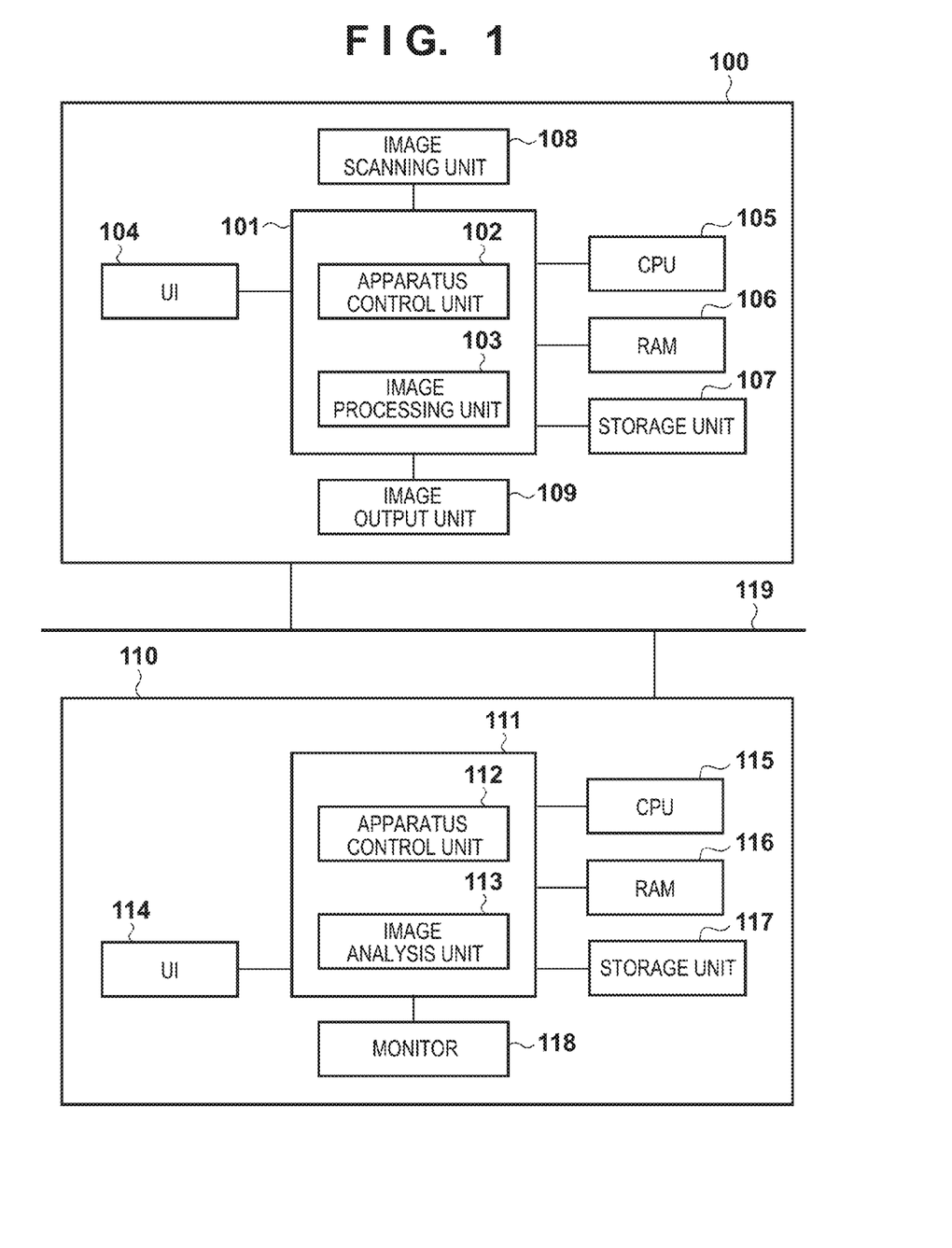
FIG. 1 is a configuration diagram of an image diagnostic system.

FIG. 1 is a block diagram of the minimum necessary configuration for implementing this embodiment. In the figure, an image forming apparatus 100 indicates an image forming apparatus of the user, which is to be subjected to remote analysis. A control unit 101 is a control unit of the image forming apparatus 100, and has an apparatus control unit 102 that controls the image forming apparatus and an image processing unit 103 that optimizes image data. The control unit 101 acquires images from an image scanning unit 108 using a CPU 105 or a RAM 106, processes and stores the image data in a storage unit 107, and outputs the images onto a recording device such as paper or a monitor via an image output unit 109, for example. The control unit 101 is notified of various settings through a UI (user interface) 104 such as a mouse and a keyboard, and the image processing unit 103 processes the image data based on the received settings. Alternatively, values set through the UI 104 are stored in the storage unit 107 through the apparatus control unit 102, and the image processing unit 103 processes the image data by loading the stored set values. The storage unit 107 stores parameters for controlling the apparatus, and applications and an OS for implementing the present embodiment, for example. The configuration described above is the minimum necessary configuration of the image forming apparatus 100 on the user side, and network interfaces such as a router and a firewall, PCs connected to the image forming apparatus, or the like, may be added thereto, as needed. Further, a configuration that is necessary in consideration of the image forming apparatus 100 as a whole may be added thereto.

An image diagnostic apparatus 110 indicates an image diagnostic apparatus placed in the service center. The image diagnostic apparatus 110 is connected to the image forming apparatus 100 via a network 119 so as to exchange image data, management data, control data, and the like therewith. A control unit 111 is a control unit of the image diagnostic apparatus 110, and has an apparatus control unit 112 that controls the image diagnostic apparatus 110 and an image analysis unit 113 that analyzes the image data. The control unit 111 analyzes the images transmitted from the image forming apparatus 100 of the user and stored in a storage unit 117, using a CPU 115 and a RAM 116. The control unit 111 is notified of various instructions through a UI 114 such as a mouse and a keyboard, and the image analysis unit 113 processes image data based on the received instructions. Alternatively, the instructions through the UI 114 are stored in the storage unit 117 or the RAM 116 through the apparatus control unit 112, and the image analysis unit 113 analyzes the image data by loading the instructions stored therein. The apparatus control unit 112, for example, outputs the images, the analysis results, or the instruction information from the UI 114 to a monitor 118. The configuration described above is the minimum necessary configuration of the image diagnostic apparatus 110 placed in the service center, and other interfaces may be added thereto, as needed. Further, a configuration that is necessary in consideration of the image diagnostic apparatus as a whole may be added thereto. Further, the image diagnostic apparatus 110 can be realized as a server or a PC of the service center but there is no limitation to this, and a configuration is conceivable in which part of the functions of the storage unit 117 and the image analysis unit 113 is realized using a remote device connected via the network 119, such as a cloud.

Hereinafter, specific examples of the image quality problem, the analysis chart, and the analysis technique will be described, and a method for transmitting the image data with a small size while satisfying the image quality necessary for the image analysis, which is a feature of this embodiment, will be described.

Examples of Defects in Image Quality

Figure 3:
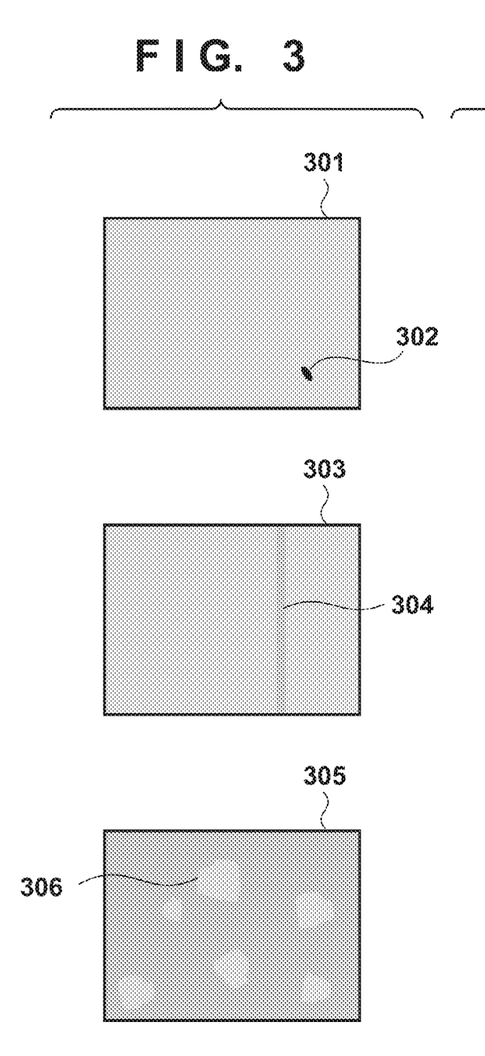
FIG. 3 is a view showing examples of an image quality problem.

FIG. 3 shows specific examples of the image quality problem that occurs in the image forming apparatus. For example, there is a dust problem involving a dust image 301 in which a small dirt 302 adheres to an output image, a streak problem involving a streak image 303 in which a line 304 is present in the longitudinal direction or the lateral direction of an image, and an unevenness problem involving an uneven image 305 in which abnormalities 306 in the form of dots or lines are visually observed over the entire image. Further, there is also a color problem associated with colors such as color deviation, which is not shown, and a scattering problem that occurs due to toner scattering caused by an explosion during fixing that mainly occurs in a fine line, for example. The aforementioned examples are typical examples of image quality problems, and image quality problems that cause user dissatisfaction occur due to various causes inside the image forming apparatus 100, in addition to these examples. These image quality problems can be roughly classified by the size of the problem area and the location thereof within the image. That is, they are classified based on whether the problem area is large or small and whether the occurrence location extends over the entire image or part of the image. In other words, the problems can be classified by the size of an image object (defective object) that is a defect or a flaw in the image quality, and the range thereof in the entire image. In the dust image 301, the problem area is small, and the occurrence range is present in part of the image. In the uneven image 305, the problem area is large and the occurrence range is present over the entire image. In the streak image 303, the problem area is small (thin) and the occurrence range is the entire image, but only in one of the longitudinal and lateral directions.

Here, consideration will be given to the image quality necessary for analyzing these problems. In order to analyze an image quality problem in which the range occupied by the defective object in the entire image is small, such as the dust problem and the streak problem, detailed image sampling is necessary for acquiring the features of the problem area, and therefore high resolution images are needed. On the other hand, with the unevenness problem, since the problem area is larger than with the dust problem and the streak problem, the features of the problem area can be acquired by sampling that is rougher than the sampling of the dust image 301 and the streak image 303, and therefore low resolution images are allowable. In this way, the necessary resolution differs depending on the image quality problem to be detected. Further, in order to specify an image quality problem in which the occurrence area cannot be specified and the problem area is small, such as the dust problem, analysis of the entire image is required, whereas the streak problem inevitably appears when the image is checked in the lateral direction. It is thought that, in the case of a problem that is seen in the entire image, such as the unevenness problem, the image quality problem is found by checking only part of the image. As described above, the image size necessary for the analysis differs depending on the image quality problem to be detected.

Image Analysis Technique

Figure 4:
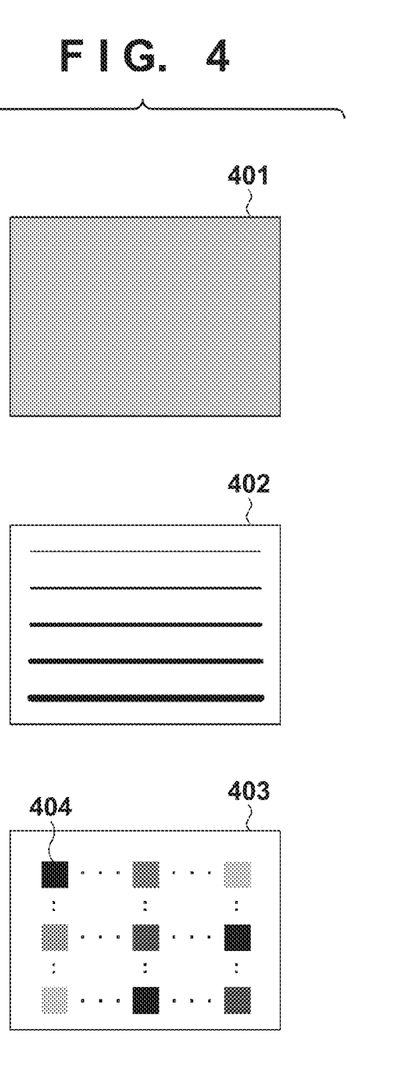
FIG. 4 is a view showing examples of an analysis chart.

An image analysis technique executed by the image analysis unit 113 of the image diagnostic apparatus 110 will be described along with examples of a chart necessary for the analysis. FIG. 4 shows specific examples of the chart. A test chart 401 is an example of a solid chart fully filled with a uniform color, and is useful for analysis of the dust problem, the streak problem, and the unevenness problem. The image forming apparatus 100 has at least one drum and a developing unit for each drum, which are not shown, and creates an output product by transferring toner adhered onto the drum to paper directly or indirectly and fixing it. Examples of types of the image forming apparatus include: an image forming apparatus having such a drum for each color of cyan (C), magenta (M), yellow (Y), and black (K) (tandem type), and an image forming apparatus having one drum for all the colors (cycle type). In the former case, it is possible that an image quality problem occurs in only a specific color, and therefore the solid chart 401 is needed for each color. Further, the color density of the solid chart 401 is not limited to the example shown in the figure, and is adjusted to a color density range suitable for detecting the image quality problem. In the case where a plurality of image quality problems are assumed, solid charts 401 with a plurality of color densities may possibly be needed. A test chart 402 is an example of a fine line chart that depicts fine lines for detecting the aforementioned scattering problem, or the like. The fine line chart 402 is not limited to the example shown in the figure, as long as it is a chart which enables analysis of a problem specific to small characters, detailed drawings, or the like, not necessarily a problem specific to fine lines. A test chart 403 is an example of a color patch chart used for analysis of a color problem. Patches 404 are monochrome patches and mixed color patches, and the patch chart 403 is a chart in which those patches 404 are arranged as needed. The phrase "as needed" herein may mean, for example, "in a predetermined manner". For example, in the case where it is desired that color uniformity in the longitudinal direction or the lateral direction is analyzed, the patches 404 of the same color need to be arranged in the longitudinal or lateral direction. Further, in order to analyze the uniformity of each color component using one test chart, patches of each color component may be dispersedly arranged so that the patches of each color have equal distribution densities.

For analysis with the solid chart 401, it is necessary to determine whether or not a portion having a different feature amount from its periphery exists in a fully uniform image. Examples of conceivable methods for the determination include a method of forming an image of a test chart, scanning it with a scanner, and performing analysis using the change in the signal values (pixel values) of the resulting image data, and a method of analyzing whether or not a component other than a direct current component is detected using a space frequency analysis. Hereinafter, the analysis technique using the solid chart 401 is referred to as analysis technique 1 (first analysis technique). In the analysis with the fine line chart 402, it is necessary to determine whether or not scattering or bleeding of the coloring material around the fine lines exists. For example, a difference from a normal case is determined by close observation of the vicinity of the fine lines to be analyzed. For this purpose, fine line regions are detected, for example, using an edge detection process or a character determination process for detecting character regions, which is conventionally used for outputting black characters with high quality in a copy. Examples of conceivable methods include a method of analyzing the roundness of the edges included in the thus detected fine line regions or the color difference from a blank region due to a coloring material such as toner scattering onto the blank region around the edges. Such differences can be easily determined if the pattern of the fine line chart is known in advance. Hereinafter, the analysis technique using the fine line chart 402 is referred to as analysis technique 2 (second analysis technique). For the analysis of the color patch chart 403, data of each patch 404 is first acquired. Since the space other than the patches is blank, the patches are easily specified. Generally, the value of the patch is determined by averaging pixel values within a small area of the patch 404. Examples of conceivable methods include a method of analyzing the difference in the extracted value from a normal case, or a method of, in the case where patches 404 of the same color are arranged within an image, analyzing in-plane uniformity by comparing the patches 404. Note that it is assumed that the values in the normal case are known in advance. It is assumed that data in the normal case of the charts for each device type in which the color features of its print unit and the color features of its scanner are reflected is set in advance in the image diagnostic apparatus 110. Hereinafter, the analysis technique of the color patch chart 403 is referred to as analysis technique 3 (third analysis technique). The analysis methods described above are merely examples, and it is possible to use any method according to which the image quality problem to be diagnosed appropriately can be analyzed.

Relationship Between Each Test Chart and Image Quality

Figure 5:
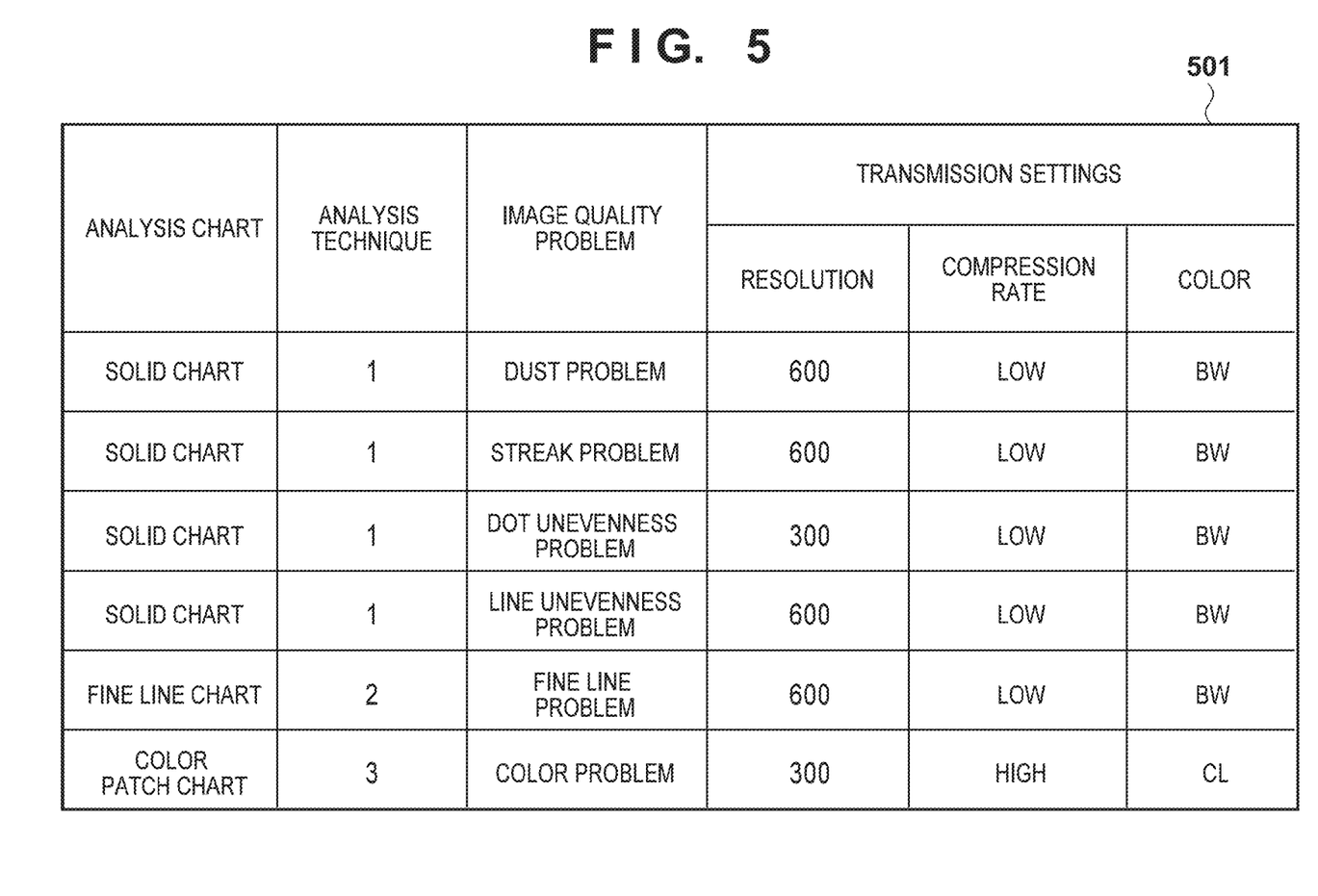
FIG. 5 is a table showing examples of optimal transmission settings corresponding to an image quality problem and an analysis technique.

With reference to FIG. 5, a method for transmitting image data with size reduced to the greatest extent possible while satisfying the image quality necessary for image analysis, which is a feature of this embodiment, will be described. FIG. 5 is a table showing a list of examples of the aforementioned analysis techniques to be applied to the analysis charts, the image quality problems to be diagnosed by the analysis, and the transmission settings that are considered to be optimal to satisfy the image quality at which analysis is possible. The items of the transmission settings indicate the resolution, compression rate, color settings showing whether the image is a color image (CL) or a monochrome image (BW), of the image data obtained by scanning a print of each test chart. Other than these items, items that are changeable in the image during transmission and that have an influence on the size of image data may be added to the transmission settings. Further, the setting range of set values for each item is also merely an example, and is regarded as being in conformity with the setting range of the image forming apparatus 100.

The relationship between the size of image data and the setting items will be simply described. As compared to image data with a resolution of 300 dpi, image data with a resolution of 600 dpi has four times the number of image pixels, and therefore has four times the size of image data as well. As the compression rate increases, the size of compressed image data decreases, but since high frequency components will be lost and blurring will be present in the decompressed image, higher compression rates are less advantageous in analysis of the image quality problems of fine images. Image data with a color setting of CL is image data using three channels, namely R, G, and B, whereas BW image data uses one channel, and thus has a size that is one-third of the size of the color image. FIG. 5 is an example in which settings that allow the size of image data to be reduced to the greatest extent possible are organized for each type of image quality problem, in consideration of the aforementioned facts. Here, transmission settings to satisfy the necessary image quality can be determined for each analysis technique. Analysis with the solid chart 401 is performed using the analysis technique 1 and corresponds to a plurality of image quality problems to be analyzed. Dust and streaks detected in the solid chart 401 are local defects of the image, and unevenness is a defect covering the entire image. In order to detect these defects with high accuracy, the setting by which image quality is the highest in the transmission settings needs to be selected. Therefore, the resolution is 600 dpi, the compression rate is low, and the color setting is CL. Analysis with the fine line chart 402 is performed using the analysis technique 2 and the image quality problems subjected to this analysis technique are fine portions such as fine lines and toner scattering. Therefore, the resolution is 600 dpi, the compression rate is low, and the color setting is BW. Analysis with the color patch chart 403 is performed using the analysis technique 2, and since the patch value is obtained by averaging pixel values within the small area, even if the image has a low resolution and is smoothed by compression, there is no influence on the obtained results. Therefore, the resolution is 300 dpi, the compression rate is high, and the color setting is BW. It should be noted that a low compression rate may include an uncompressed state. Further, a low compression rate is set only when lossy compression is used as a compression method, and in the case where lossless compression is used, although a high compression rate generally cannot be expected, there is no need to set a low compression rate due to the fact that high frequency components are maintained. In the case where a high compression rate can be set as a compression rate, it is desirable to use lossy compression. The resolution may be changed, for example, by changing scanner settings or by reducing the resolution of image data scanned with the highest resolution to a target resolution. Both the compression and the resolution reduction, or either one of them may be performed, in accordance with the transmission settings.

As described above, since the transmission settings that satisfy the necessary image quality differ depending on the analysis technique to be applied in the analysis, the association between the analysis techniques and the transmission settings that satisfy the necessary image quality needs to be set in advance. In the case where a plurality of transmission settings compete with each other as in the analysis technique 1, priority is given to the setting that allows the highest image quality for each item of the transmission settings. This makes it possible to reduce the size of image data to the greatest extent possible while satisfying the necessary image quality suitable for the analysis technique, as compared to the case where all the analysis charts are transmitted with the same settings for high image quality.

Figure 6:
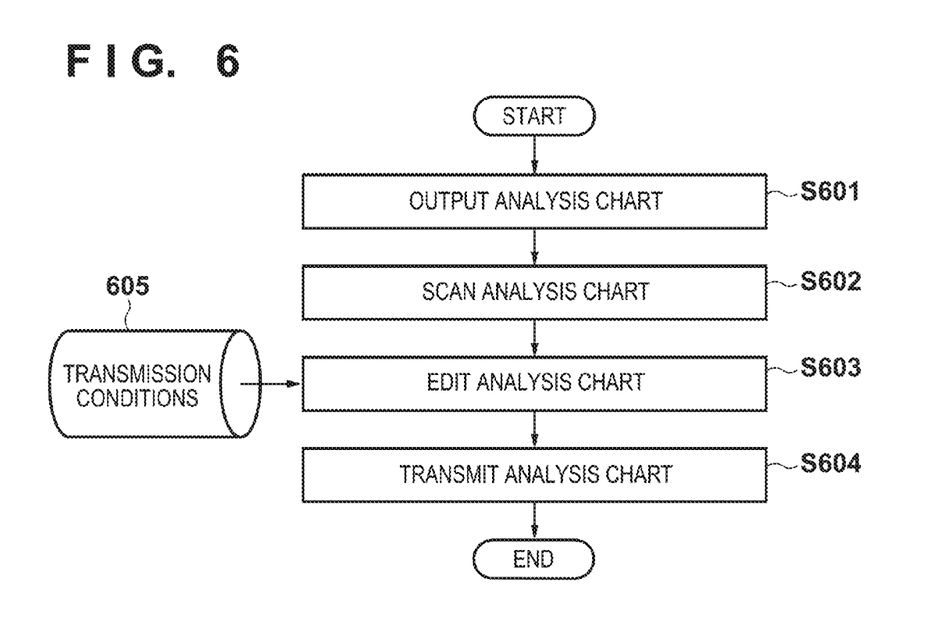
FIG. 6 is a flowchart of processing procedures according to a first embodiment.

FIG. 6 is a flow showing the processing flow of the present invention, which will be described below in detail. A control program (not shown) for implementing this embodiment is stored in the storage unit 107 of the image forming apparatus 100, and is loaded into the RAM 106 so as to be executed by the CPU 105. A description given herein is based on the premise that the user executes an image analysis mode set in advance in the image forming apparatus 100 and performs an operation according to procedures.

In step S601, the image forming apparatus 100 produces an image in the control unit 101 in response to an instruction through the UI 104 and outputs it to the image output unit 109. The image output unit 109, for example, is an electrophotographic printer unit, and the instruction to output an analysis chart may be any instruction such as an instruction through an interface, which is not shown, or an instruction through remote operation from the service center. The test charts themselves may be stored in advance in the storage unit 107, or may be received from the image diagnostic apparatus 110 upon making a request to the image diagnostic apparatus 110 in response to the instruction to output an analysis chart. After outputting the analysis chart, the control unit 101 of the image analyzer 100 prompts the user to scan the output chart through the UI 104.

In step S602, the image scanning unit 108 scans all of one or more output analysis charts. The image scanning unit 108 has a method of scanning an image on a sheet placed on a glass plate called a platen, and a method of scanning an image on a sheet placed on an ADF (Auto Document Feeder) having an automatic paper feeding function. In the case of scanning a plurality of analysis charts, scanning with the ADF can be said to be practical since it requires the least effort for the user. The analysis chart is set in the image scanning unit 108 in accordance with the procedural instructions of the image analysis mode, and an instruction indicating completion of preparation is transmitted from the UI 104 to the control unit 101, which causes the image scanning unit 108 to start scanning. The image scanning unit 108 stores, in the storage unit 107, the image scanned with a resolution of 600 dpi and a low compression rate, as an RGB image, without falling below the conditions of the transmission settings. In order to distinguish each analysis chart from the other by looking at the image, identification information may be recorded on the chart in a superimposed manner. The identification information also is scanned as a part of the image by scanning the image.

In step S603, the image processing unit 103 edits the analysis charts, based on transmission conditions 605 stored in the storage unit 107. The scanned image of the solid chart 401 is monochromatized, the scanned image of the fine line chart 402, which has no items to be edited, is left as it is, and the scanned image of the color patch chart 403 is downsampled to a resolution of 300 dpi. In step S604, the apparatus control unit transmits the edited scanned images to the image analyzer 110 via the network 119. The correspondence of the pages of the scanned image data to the respective charts can be specified using the aforementioned identification information.

In this way, image data of the charts used for image diagnostics requiring high-resolution images, e.g., diagnosis of local defects such as dust and streaks, is converted so as to maintain high frequency components and have a large size, and image data of the charts used for image diagnostics for which low resolution images suffice, e.g., diagnosis of defects that extend over the entire image, such as color unevenness, as compared to image diagnosis of dust, streaks, or the like, is converted so as not to contain high frequency components and so as to have a small image size (that is, low pixel density), as compared to test charts used for diagnosis of dust, streaks, or the like. Having a small image size in this context means having a low pixel density (resolution), which therefore can be paraphrased as having a small amount of high frequency components, or a low resolution, in terms of an image with the same size. For example, a 300-dpi image has half the resolution of a 600-dpi image, and contains half the highest space frequency, as well. In this way, the more the space frequency contained in the image can be reduced, that is, the more the resolution can be reduced, the smaller the size of image data will be, and the higher the compression rate at which the image data can be compressed will be, and thus the data amount can be further reduced.

As described above, the analysis techniques and the transmission settings that satisfy the necessary image quality are associated with each other in advance, and images are automatically converted and transmitted during image transmission, and it is thereby possible to transmit the images with the size of data reduced to the greatest extent possible while satisfying the necessary image quality, without burdening the user.

Embodiment 2

Only parts that differ from Embodiment 1 described above will be described herein. Unlike Embodiment 1, this embodiment proposes a method of further reducing the size of image data to be transmitted by the image forming apparatus 100, based on the analysis data accumulated in the image diagnostic apparatus 110.

In an image diagnostic system, as image quality problems of the user are analyzed, the analysis results are accumulated. That is, it is thought that a trend regarding image quality problems with a high occurrence frequency will appear. Examples thereof include a trend unique to the machine of the user which appears due to the installation environment and use frequency of the image forming apparatus 100, and a trend that appears due to the difference in parts or mechanical configuration for each machine type. In Embodiment 1, scanned images of the analysis charts corresponding to every analysis technique are transmitted to the image diagnostic apparatus 110, but with this method, there will end up being a large number of charts. Further, since all the image quality problems are assumed, the transmission settings for high image quality are set. Therefore, narrowing down to image quality problems that actually occur and image quality problems with a high possibility of occurrence makes it possible to transmit high priority charts with reduced data size.

For example, in the case where it is determined that the analysis of the fine line problem is unnecessary, the fine line chart 402 is eliminated from the output targets, and thereby the size of image data can be reduced. Further, if the image quality problem analyzed using the analysis technique 1 of FIG. 5 is only the point unevenness problem, the resolution in the transmission settings that is necessary for the analysis technique 1 can be reduced to 300 dpi.

The method of narrowing down the analysis charts and the method of changing the transmission settings that satisfy necessary image quality for each analysis technique will be described. Various methods can be employed for narrowing down the analysis charts. Examples of a conceivable determination method are as follows. For example, an image problem caused by parts of the image forming apparatus of the user that have just been replaced is eliminated from the analysis targets because those parts are unlikely to cause the image quality problem again. Alternatively, an image quality problem that has an exceptionally low occurrence frequency based on the data stored in the image diagnostic apparatus 110, and that is determined to be different from an image quality problem about which the user has inquired, based on a direct communication with the user on a service call, is eliminated from the analysis targets. Alternatively, an image quality problem that has not occurred at all in the machine of the user or machines of the same type as the user's machine is eliminated from the analysis targets. Further, even if the number of types of analysis charts cannot be reduced, in the case where a chart is needed for each color of CMYK, like the solid chart 401, by merely eliminating colors that have been determined as being unrelated to the image quality problem, the number of charts can be reduced. The method of changing the transmission settings that satisfy the necessary image quality for each analysis technique can be performed from point of view similar to the reduction of charts. Further, as seen from the aforementioned features of the image quality problems, some of the image quality problems occur in the entire image, depending on their type, and therefore only a part of the image needs to be analyzed. Therefore, only the part of the image that is necessary for the analysis is cut out and transmitted, and thereby a further reduction of the size of image data can be expected.

Figure 7:
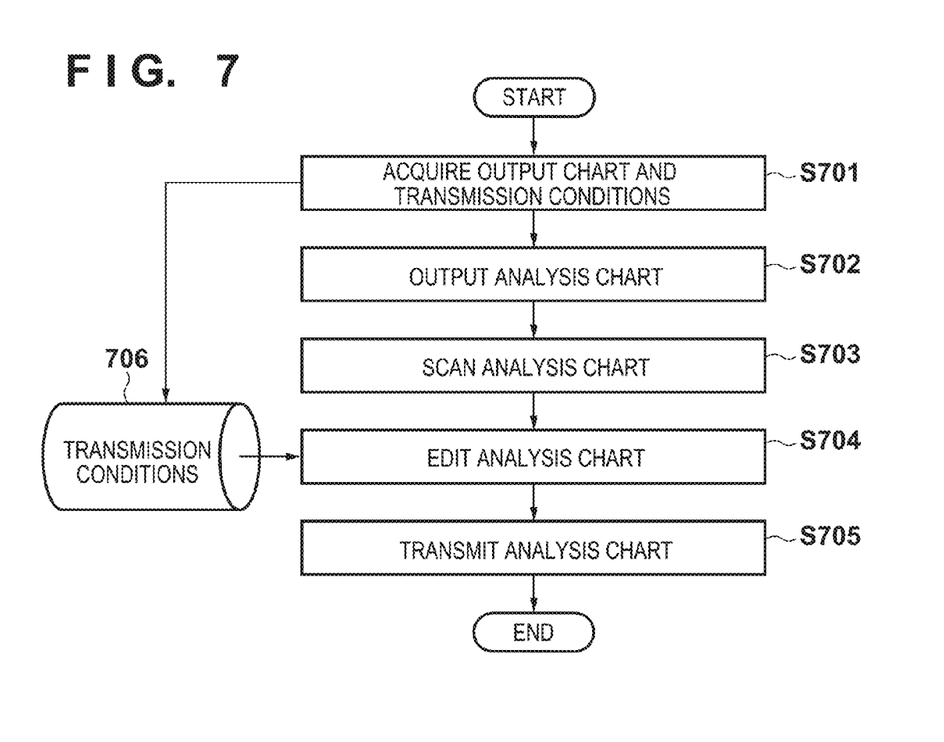
FIG. 7 is a flowchart of processing procedures according to a second embodiment.

FIG. 7 is a flow showing the processing flow of this embodiment. Step S701 is a feature of this embodiment, where the image forming apparatus 100 makes an inquiry to the image diagnostic apparatus 110, acquires information regarding the analysis charts that are to be output and the transmission settings thereof, and stores it in the storage unit 107. At this stage, image data of the aforementioned necessary charts and the transmission settings are acquired from the image diagnostic apparatus 110. In step S702, the control unit 101 generates analysis charts based on the acquired information and outputs them through the image output unit 109. In step S703, the image scanning unit 108 scans all of the one or more analysis charts that were output. In step S704, the image processing unit 103 edits the analysis charts based on transmission conditions 706 acquired from the image analyzer 110 and stored in the storage unit 107. In step S705, the apparatus control unit transmits the edited scanned images to the image analyzer 110 via the network 119.

As described above, the number of analysis charts is reduced based on the analysis data accumulated in the image analyzer 110, and the transmission settings necessary for the analysis are also changed, thereby eliminating unnecessary images or transmission of image data with excessive image quality, and thus, the size of image data can be efficiently reduced. Then, the aforementioned determination is made based on a trend in sufficient analysis results accumulated in the image analyzer, thereby allowing a reduction of the size of image data without a reduction in the accuracy of analyzing the image quality problems.

Embodiment 3

Only parts that differ from Embodiment 2 described above will be described herein. Unlike Embodiment 2, this embodiment proposes a method of more reliably associating the scanning order of the analysis charts and the transmission settings. In the case where scanned images are edited based on the premise that the analysis charts are scanned in the same order as the order in which they are output, it is thought that if the order goes wrong, the transmission settings of all the scanned images will go wrong and the analysis will no longer be possible, unless the identification information is printed in a superimposed manner.

Examples of a method of identifying an analysis chart include a method in which chart information is somehow embedded, for example, using a technique such as a QR code (registered trademark) when outputting the analysis chart, and the chart information is analyzed after scanning. However, in the case of using a QR code, the image forming apparatus 100 is limited to one capable of printing and analyzing the QR code. Therefore, as a method that can be easily implemented, a method of identifying a chart from the features of the chart itself such as color information, edge information, and data size when it is compressed. For example, in the scanned image of the solid chart 401, only one of the CMYK colors is dominant, and in the scanned image of the color patch chart 403, the CMYK colors are mixed. In the fine line chart 402 and the solid chart 401 of color K, the dominant color is black in both charts, whereas in contrast to the solid chart 401, a lot of blank regions and edges are present in the fine line chart 402. As described above, the analysis charts can be identified based on the relative relationship between scanned images, by figuring out the feature amounts of the scanned images when the charts are scanned with 600 dpi and RGB in advance.

Figure 8:
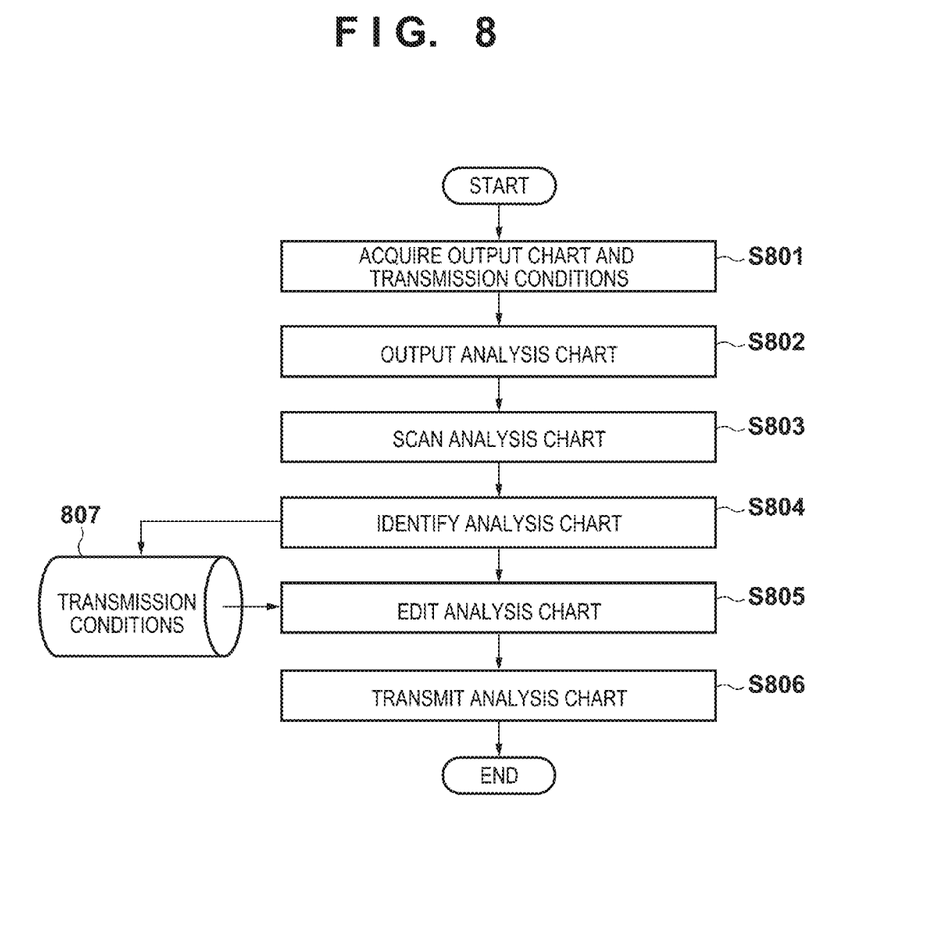
FIG. 8 is a flowchart of processing procedures according to a third embodiment.

FIG. 8 is a flow showing the processing flow of the present invention. In step S801, the image forming apparatus 100 makes an inquiry to the image diagnostic apparatus 110, acquires information regarding analysis charts to be output and the transmission settings thereof, and stores it in the storage unit 107. In step S802, the control unit 101 produces analysis charts based on the acquired information, and outputs them through the image output unit 109. In step S803, the image scanning unit 108 scans all of one or more output analysis charts. In step S804, the analysis charts are identified by the aforementioned method. In step S805, the image processing unit 103 edits the analysis charts by comparing transmission conditions 808 acquired from the image diagnostic apparatus 110 and stored in the storage unit 107 with chart information identified in step S804. In step S807, the apparatus control unit transmits the edited scanned images to the image analyzer 110 via the network 119.

As described above, when a plurality of analysis charts are output and scanned by the user, the charts can be identified easily by recognizing the types of the charts using the features of the analysis charts. This makes it possible to avoid a situation in which the images are edited based on wrong transmission settings, and thus can reduce the risk of occurrence of trouble, such as rescanning and retransmission of the images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261836, filed Dec. 18, 2013, which is hereby incorporated by reference herein in its entirety.

What is claimed is:

1. An image forming apparatus configured to print a predetermined test chart that corresponds to an image defect to be analyzed, and to transmit the printed test chart to an image diagnostic apparatus as scanned image data, the image forming apparatus comprising:
    an image forming unit that prints the test chart;
    a scanning unit that scans the test chart printed by the image forming unit and acquires the image data;
    a determination unit that determines a transmission setting for transmitting the image data of a test chart scanned by the scanning unit according to the type of image defect corresponding to the test chart, the transmission setting including an item that has an influence on the size of the image data; and
    a transmission unit that transmits the image data acquired by scanning the test chart by the scanning unit, the image data to be transmitted having a data size according to the transmission setting determined by the determination unit.

2. The image forming apparatus according to claim 1, wherein the determination unit determines the transmission setting so that the data size of a test chart corresponding to an image defect covering an entire image is smaller than the size of a test chart corresponding to an image defect covering a part of an image.

3. The image forming apparatus according to claim 2, wherein the image defect that extends over the entire image includes color unevenness or dot unevenness, where the test chart that corresponds to the color unevenness is a color patch chart in which a color patch is arranged, and the test chart that corresponds to the dot unevenness is a solid chart composed of a uniform color.

4. The image forming apparatus according to claim 2, wherein the local image defect includes a dust image, a streak image, or an image in which a coloring material is scattered, where the test chart that corresponds to the dust image and the streak image is the solid chart, and the test chart that corresponds to the image in which the coloring material is scattered is a fine line chart including a fine line.

5. The image forming apparatus according to claim 1, wherein the transmission unit transmits the image data of the test chart, the data size of the image data of the test chart having been changed according to a compression rate indicated by the transmission setting.

6. The image forming apparatus according to claim 1, wherein the transmission unit transmits the image data of the test chart, the data size of the image data of the test chart having been changed according to a resolution indicated by the transmission setting.

7. The image forming apparatus according to claim 1, wherein the transmission unit transmits the image data of the test chart, the data size of the image data of the test chart having been changed according to a color setting indicated by the transmission setting.

8. The image forming apparatus according to claim 1, further comprising:
    a requesting unit that requests the image data of the test chart and transmission setting from the image diagnostic apparatus; and
    a receiving unit that receives the image data of the test chart and the transmission setting from the image diagnostic apparatus, wherein the image forming unit prints the test chart received by the receiving unit, and the transmission unit transmits the image data scanned by the scanning unit with a resolution, a compression rate, and a color setting of the test chart, which are included in the transmission setting.

9. The image forming apparatus according to claim 1, wherein the image forming unit forms an image of identification information of the test chart so that the image is superimposed on the test chart, and the transmission unit identifies the image data of the test chart by the identification information, and transmits the image data of the test chart that corresponds to an image defect that extends over the entire image, wherein the size of the image data of the test chart that corresponds to an image defect that extends over the entire image is smaller than the size of the image data of the test chart that corresponds to a local image defect.

10. The image forming apparatus according to claim 1, wherein the item included in the transmission setting indicates a resolution and/or a color setting, the color setting showing whether the image is a color image or a monochrome image.

11. An image diagnostic system comprising:

an image forming apparatus; and an image diagnostic apparatus configured to specify a problem of the image forming apparatus by analyzing the image data of the test chart received from the image forming apparatus, wherein the image forming apparatus is configured to print a predetermined test chart that corresponds to an image defect to be analyzed, and to transmit the printed test chart to the image diagnostic apparatus as scanned image data, the image forming apparatus comprising:

an image forming unit that prints the test chart;

a scanning unit that scans the test chart printed by the image forming unit and acquires the image data;

a reduction unit that reduces the data size of image data of the test chart scanned by the scanning unit so that the reduced data size becomes a predetermined size according to the type of image defect corresponding to the test chart;

a determination unit that determines a transmission setting for transmitting the image data of the test chart scanned by the scanning unit according to the type of image defect corresponding to the test chart, the transmission setting including an item that has an influence on the size of the image data; and a transmission unit that transmits the image data acquired by scanning the test chart by the scanning unit, the image data to be transmitted having a data size according to the transmission setting determined by the determination unit.

12. An image diagnostic method in which a predetermined test chart that corresponds to an image defect to be analyzed is printed, and the printed test chart is transmitted to an image diagnostic apparatus as scanned image data, the method comprising:

printing the test chart;

acquiring image data by scanning the printed test chart;

determining a transmission setting for transmitting the image data of the test chart acquired in the acquiring step according to the type of image defect corresponding to the test chart, the transmission setting including an item that has an influence on the size of the image data; and transmitting the image data acquired by scanning the test chart, the image data to be transmitted having a data size according to the transmission setting determined in the determining step.

13. A non-transitory computer readable medium storing a program therein for causing a computer to perform an image diagnostic method in which a predetermined test chart that corresponds to an image defect to be analyzed is printed, and the printed test chart is transmitted to an image diagnostic apparatus as scanned image data, the method comprising:

printing the test chart;

acquiring image data by scanning the printed test chart;

determining a transmission setting for transmitting the image data of the test chart acquired in the acquiring step according to the type of image defect corresponding to the test chart, the transmission setting including an item that has an influence on the size of the image data; and transmitting the image data acquired by scanning the test chart, the image data to be transmitted having a data size according to the transmission setting determined in the determining step.

14. An image diagnostic method in which a predetermined test chart that corresponds to an image defect to be analyzed is printed, and the printed test chart is transmitted to an image diagnostic apparatus as scanned image data by an image forming apparatus, the method comprising:

printing the test chart using the image forming apparatus;

scanning the test chart printed in the printing step to acquire image data;

determining a transmission setting for transmitting the image data of the test chart acquired in the acquiring step according to the type of image defect corresponding to the test chart, the transmission setting including an item that has an influence on the size of the image data;

transmitting to the image diagnostic apparatus the image data acquired by scanning the test chart in the scanning step, the image data to be transmitted having a data size according to the transmission setting determined in the determining step; and specifying a problem of the image forming apparatus by analyzing the image data of the test chart transmitted to the image diagnostic apparatus in the transmitting step.

* * * * *